United States Patent
Wilson-Thomas et al.

(10) Patent No.: US 11,763,078 B2
(45) Date of Patent: Sep. 19, 2023

(54) PROVISIONAL SELECTION DRIVES EDIT SUGGESTION GENERATION

(71) Applicant: Microsoft Technology Licensing, LLC, Redmond, WA (US)

(72) Inventors: Mark Alistair Wilson-Thomas, Mercer Island, WA (US); Jonathan Keith Simmons, Sammamish, WA (US); David Ellis Pugh, Bellevue, WA (US); Vivian Julia Lim, Redmond, WA (US); Anqi Li, Redmond, WA (US); Shwetha Srinath, Bellevue, WA (US); German David Obando Chacon, Kirkland, WA (US); Jin Woo Jang, Seattle, WA (US); Shengyu Fu, Redmond, WA (US); Shao Kun Deng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 17/237,936

(22) Filed: Apr. 22, 2021

(65) Prior Publication Data

US 2022/0358286 A1 Nov. 10, 2022

(51) Int. Cl.
*G06F 40/274* (2020.01)
*G06F 40/284* (2020.01)
(Continued)

(52) U.S. Cl.
CPC ............... *G06F 40/274* (2020.01); *G06F 8/33* (2013.01); *G06F 40/166* (2020.01); *G06F 40/284* (2020.01)

(58) Field of Classification Search
CPC .... G06F 40/274; G06F 40/166; G06F 40/284; G06F 8/33; G06F 8/35; G06F 3/04812; G06F 3/0482; G06F 3/04842
See application file for complete search history.

(56) References Cited

U.S. PATENT DOCUMENTS

2006/0184608 A1 8/2006 Williams et al.
2010/0070721 A1 3/2010 Pugh et al.
(Continued)

FOREIGN PATENT DOCUMENTS

| WO | 2008157021 A2 | 12/2008 | |
| WO | WO-2020061586 A1 * | 3/2020 | ........... G06F 17/277 |
| WO | WO-2022015730 A1 * | 1/2022 | |

OTHER PUBLICATIONS

"International Search Report and Written Opinion Issued in PCT Application No. PCT/US22/023204", dated Jun. 28, 2022, 10 Pages.
(Continued)

*Primary Examiner* — Chau T Nguyen
(74) *Attorney, Agent, or Firm* — Ogilvie Law Firm

(57) ABSTRACT

Edit automation enhancements may be implemented in source code editors and other text editors. Provisional selections that indicate user intentions are submitted to a suggestion generator with other edit context information, to improve the quality of generated text suggestions and reduce the cognitive load on users. A provisional selection may include a highlighted completion list entry, or document text targeted by a hovering cursor, or metainformation text targeted by the hovering cursor, for example. An inline grey text suggestion driven by provisional selection may be displayed simultaneously with completion list suggestions that were created without regard to provisional selection. Suggestions driven by provisional selection may be interleaved with existing document text. Suggestions may be accepted fully in one gesture, or in parts. Suggestions may be edited by a user before being accepted, driving further suggestion refinement. Multiple suggestions may be displayed simultaneously, reducing pressure on the suggestion generator.

20 Claims, 4 Drawing Sheets

(51) Int. Cl.
*G06F 40/166* (2020.01)
*G06F 8/33* (2018.01)

(56) References Cited

U.S. PATENT DOCUMENTS

| | | | |
|---|---|---|---|
| 2010/0280903 A1 | 11/2010 | Barlin et al. | |
| 2011/0197178 A1* | 8/2011 | Johnston | G06F 8/33 717/123 |
| 2013/0002683 A1 | 1/2013 | Li et al. | |
| 2013/0027309 A1 | 1/2013 | Li et al. | |
| 2014/0082718 A1 | 3/2014 | Yu et al. | |
| 2015/0248427 A1 | 9/2015 | Li et al. | |
| 2015/0248465 A1 | 9/2015 | Yan et al. | |
| 2015/0277860 A1* | 10/2015 | Hur | G06F 8/33 717/110 |
| 2016/0004421 A1 | 1/2016 | Hammontree et al. | |
| 2016/0070422 A1 | 3/2016 | Hammontree et al. | |
| 2016/0124720 A1* | 5/2016 | Beckwith | G06F 3/04842 717/113 |
| 2017/0371629 A1* | 12/2017 | Chacko | G06F 8/35 |
| 2019/0146758 A1 | 5/2019 | Lantz et al. | |
| 2019/0147048 A1 | 5/2019 | Pugh et al. | |
| 2019/0156702 A1 | 5/2019 | Sannidhanam et al. | |
| 2019/0227774 A1 | 7/2019 | Banuelos et al. | |
| 2019/0243617 A1 | 8/2019 | Stevens et al. | |
| 2019/0272171 A1 | 9/2019 | Chen et al. | |
| 2019/0303108 A1 | 10/2019 | Fu et al. | |
| 2019/0303109 A1 | 10/2019 | Fu et al. | |
| 2019/0332968 A1 | 10/2019 | Fu et al. | |
| 2019/0354716 A1 | 11/2019 | Basava et al. | |
| 2019/0354718 A1 | 11/2019 | Chandnani et al. | |
| 2020/0097261 A1* | 3/2020 | Smith | G06F 40/284 |
| 2020/0097589 A1 | 3/2020 | Fu et al. | |
| 2020/0159505 A1 | 5/2020 | Narayanan et al. | |
| 2020/0167132 A1 | 5/2020 | Horton et al. | |
| 2020/0175316 A1 | 6/2020 | Fu et al. | |
| 2020/0175423 A1 | 6/2020 | Keech et al. | |
| 2020/0249918 A1 | 8/2020 | Svyatkovskiy et al. | |
| 2020/0272426 A1 | 8/2020 | Fu et al. | |
| 2020/0272443 A1 | 8/2020 | Fu et al. | |
| 2020/0334054 A1 | 10/2020 | Gulwani et al. | |
| 2020/0410390 A1 | 12/2020 | Fu et al. | |
| 2021/0029108 A1 | 1/2021 | Obando Chacon et al. | |
| 2021/0034335 A1 | 2/2021 | Svyatkovskiy et al. | |
| 2021/0303271 A1* | 9/2021 | Hicklin | G06F 8/33 |
| 2022/0188081 A1* | 6/2022 | Ni | G06N 3/0454 |
| 2022/0245475 A1* | 8/2022 | Blizzard | G06F 3/0482 |

OTHER PUBLICATIONS

Mohamed Radwan, "What's new in Visual Studio IntelliCode", retrieved from <<https://mohamedradwan.com/2019/01/13/whats-new-in-visual-studio-intellicode/>>, Jan. 13, 2019, 9 pages.

"Visual Studio IntelliCode: AI-assisted development", retrieved from <<https://web.archive.org/web/20190603153343/https:/visualstudio.microsoft.com/services/intellicode/>>, Jun. 3, 2019, 7 pages.

"Microsoft Visual Studio", retrieved from <<https://en.wikipedia.org/wiki/Microsoft_Visual_Studio>>, Jul. 18, 2019, 14 pages.

"Machine learning", retrieved from <<https://en.wikipedia.org/wiki/Machine_learning>>, Jul. 18, 2019, 20 pages.

"Intelligent code completion", retrieved from <<https://en.wikipedia.org/wiki/Intelligent_code_completion>>, Feb. 7, 2019, 5 pages.

"Integrated development environment", retrieved from <<https://en.wikipedia.org/wiki/Integrated_development_environment>>, Jun. 27, 2019, 6 pages.

Jesus Rodriguez, "Facebook Uses Machine Learning to Help Developers Write Code Faster", retrieved from <<https://towardsdatascience.com/facebook-uses-machine-learning-to-help-developers-write-code-faster-577f38008847>>, Apr. 18, 2019, 8 pages.

"Autocomplete", retrieved from <<https://en.wikipedia.org/wiki/Autocomplete>>, Jul. 11, 2019, 10 pages.

"Developer Tools", retrieved from <<https://medium.com/kitepython/tagged/developer-tools>>, retrieved Apr. 4, 2021, 3 pages.

"Get AI Code Completions for your IDE", retrieved from <<https://www.codota.com/>>, retrieved Apr. 4, 2021, 10 pages.

"Katalon Studio v4.5 with new features and enhancements is available now!", retrieved from <<https://www.katalon.com/resources-center/blog/katalon-studio-v4-5-new-features-enhancements-available-now/>>, retrieved Apr. 4, 2021, 6 pages.

Abigail Abesamis Demarest, "How to turn off the predictive text feature in Gmail, or add predictive text personalization", retrieved from <<https://www.businessinsider.com/how-to-turn-off-predictive-text-in-gmail>>, Sep. 11, 2020, 7 pages.

"Predictive text", retrieved from <<https://en.wikipedia.org/wiki/Predictive_text>>, Feb. 26, 2021, 6 pages.

Lance Whitney, "How to View Files in Windows 10 Without Opening Them", retrieved from <<https://www.pcmag.com/how-to/how-to-view-files-in-windows-10-without-opening-them>>, Feb. 18, 2020.

"Google Translate", retrieved from <<https://en.wikipedia.org/wiki/Google_Translate>>, Apr. 3, 2021, 26 pages.

"Google AI", retrieved from << https://twitter.com/GoogleAI/status/1552036457996374016 >>, Jul. 26, 2022, 2 pages.

Maxim Tabachnyk and Stoyan Nikolov, "ML-Enhanced Code Completion Improves Developer Productivity", retrieved from << https://ai.googleblog.com/2022/07/ml-enhanced-code-completion-improves.html >>, Jul. 26, 2022, 5 pages.

"Google AI Blog: ML-Enhanced Code Completion Improves Developer Productivity", retrieved from << https://www.reddit.com/r/mlscaling/comments/waejqd/google_ai_blog_mlenhanced_code_completion/ >>, Jul. 2022, 7 pages.

* cited by examiner

PROVISIONAL SELECTION DRIVES EDIT SUGGESTION GENERATION

BACKGROUND

Noon Programs for creating, modifying, or otherwise editing documents were among the first software tools created, and such editors have undergone many changes over time, including many improvements. Some editing tools accept input not only in the form of characters typed on a keyboard, but also in the form of data sent from a mouse, pen, touch pad, touch screen, microphone, or other device. Some permit a user to define a sequence of keys as a macro, allowing the user to easily repeat a command sequence. Many editors provide a WYSIWYG (what you see is what you get) user experience, so that an appearance of a document onscreen in the editor closely resembles a result of printing the document. Some editing tools support multiple windows, to assist a user who is contemporaneously editing multiple files or editing different parts of a given file, or both. Some editors support integration of graphic images into a document, or provide a user with access to graphics editing tools within a document editing session.

The range of "text" operated upon by an editor was originally limited mostly to alphabet letters, numbers, and punctuation. But over time, the text one can edit with a program has expanded to include at least mathematical symbols, geometric shapes, music and other notational systems, logographic and syllabic scripts, and many other written symbols. As of the present time, the Unicode® technology standard for encoding, representing, and handling text covers over 150 modern and historic scripts, including over 140,000 characters (mark of Unicode, Inc.).

Some editors are specialized for particular knowledge areas or fields of practice, such as video editing, sound editing, or software source code editing. In particular, some source code editors provide integrated functionality for syntax checking, autocompletion, indentation, brace matching, and easy access to a compiler, interpreter, or debugger.

Despite these advancements, improvements are still possible in the field of tools for editing source code or other documents that contain text.

SUMMARY

Some embodiments described herein use provisional selections to drive automatic generation of edit suggestions during an editing session. As a software developer or other editor user provisionally selects different entries shown in a completion list, or provisionally selects other text, the provisional selection serves as an input to a model that automatically generates edit suggestions.

Thus, an enhanced editor tool may offer more suggestions than only the completion list entries. More focused editing suggestions may be generated automatically. Suggestion generation may be based not only on static analysis and on particular text near a current insertion point in the document, but also be based on which completion list entry or other displayed text is provisionally selected by the user and thus presumed relevant.

Some embodiments described herein use or provide a hardware and software combination which is configured for edit automation. The combination includes a digital memory, and a processor which is in operable communication with the memory. The processor is configured, e.g., by tailored editor software, to perform edit automation steps, which include submitting edit context information—including a provisional selection—to a suggestion generation model, getting from the suggestion generation model a text suggestion which is based at least in part on the provisional selection, and displaying the text suggestion near the text insertion point. Edit automation method embodiments and configured storage device embodiments are also described herein.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Innovations may expand beyond their origins, but understanding an innovation's origins can help one more fully appreciate the innovation. In the present case, some teachings described herein were motivated by Microsoft innovators who recognized and faced technical challenges arising from their efforts to make source code editors more effective and easier to use.

Some source code editors provide users with an autocompletion functionality that provides a completion list with entries the user can choose from, so that with a single gesture the user can insert a string of characters into a text document. Autocompletion can reduce the number of keystrokes made, and helps provide consistency and prevent spelling errors. A completion list can also make it easier to edit a document when the user might not recall an item's name but would recognize the name in a list, e.g., a list of methods or classes in a source code file.

For example, suppose a developer is editing a file that includes the following source code if statement, and suppose a text insertion point is indicated by the vertical bar |:

```
if (author != null)
{
    queryable = queryable.Where(x => x.|
}
```

The text insertion point of a document in an editor is the location where typed or pasted text would be inserted. It may be indicated by a vertical bar |, or by some other visual indicator, or it may be present without a visual indicator. In editors that recognize multiple input devices, such as a keyboard and a mouse, a distinction may be made between a text insertion point and a cursor location. A cursor may be positioned by mouse movements without changing the text insertion point, and the text insertion point may change without moving the mouse cursor. Sometimes a mouse operation, e.g., a double-click, may be used to change the text insertion point to match the mouse cursor location.

Some editors will display a completion list that is based on the text insertion point, and some static information. For example, a completion list having entries such as these might be displayed near the insertion point for the source code if statement above:

AfterAdminReview
ArticleFavorites
ArticleId
ArticleTags
Author
Body
Comments

Figure 4:
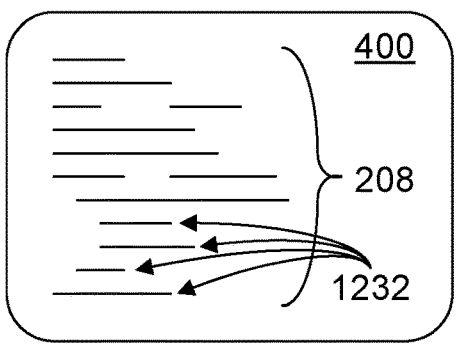
FIG. 4 shows a stylized user interface containing document text that is represented in the Figures by line segments.
Figure 5:
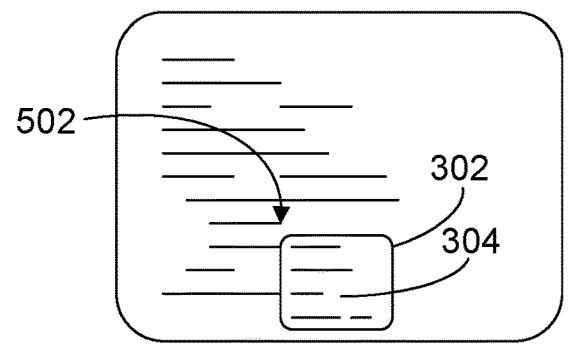
FIG. 5 shows the document text and user interface of FIG. 4, with a completion list displayed to assist editing at a text insertion point.

FIG. 5 shows a completion list 302 near an insertion point 502 of a text 208 that is being edited. The text 208 may be source code, but teachings herein may also facilitate editing other kinds of text 208. The completion list has entries 304. The completion list entries 304 and the text 208 are shown in FIGS. 4 through 11 as line segments in order to provide clarity, because the operations and operational results illustrated in the Figures do not depend on any particular text.

A completion list 302 may be generated by static analysis, e.g., from a list of available application program interfaces (APIs) and from program language reserved words. Although such a completion list is often helpful, it may contain entries that a software developer considers irrelevant at a particular insertion point in source code the developer is editing. Other entries of the completion list might be considered relevant, but they could still be somewhat distant from what the developer wants.

Accordingly, a set of technical challenges arise involving edit suggestions offered to a developer or other user of an editor. One may view these as challenges arising from this technical question: How specifically may an editing tool facilitate generation and presentation of appropriate editing suggestions at appropriate times and ways within an editing session, and at appropriate places within a document that is being edited?

The present disclosure provides answers to this question, in the form of edit automation functionalities which may be used in various combinations with one another, or alone, in a given embodiment. Determining appropriate editing suggestions, for example, may involve focusing beyond a completion list by using a provisional selection—of a completion list entry or other text—as an input to a machine learning model or other suggestion generation model. Determining appropriate places to make edits may involve not only an insertion point but staged commitment of a multipart suggestion (or a set of related suggestions), and may interleave suggestion text with existing document text. Determining appropriate times and ways to make edit suggestions may involve choices for commit gestures, choices of how to present suggestions in a user interface, and responses to cursor hovering. These and other functionalities are described herein.

Operating Environments

Figure 1:
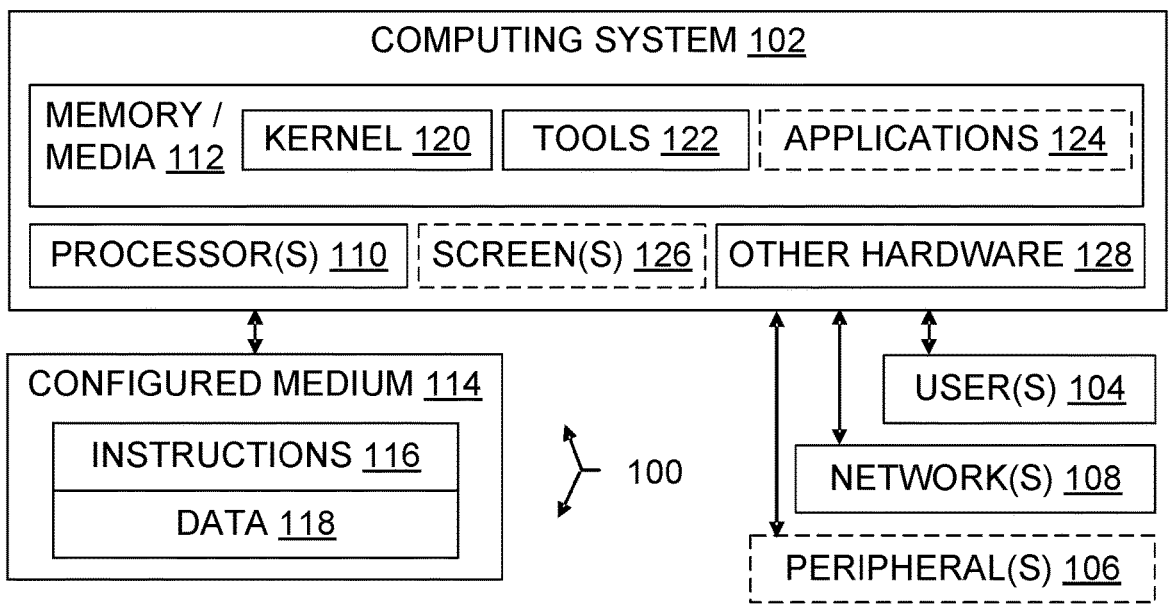
FIG. 1 is a block diagram illustrating computer systems generally and also illustrating configured storage media generally.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (AS-SPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, edit automation functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
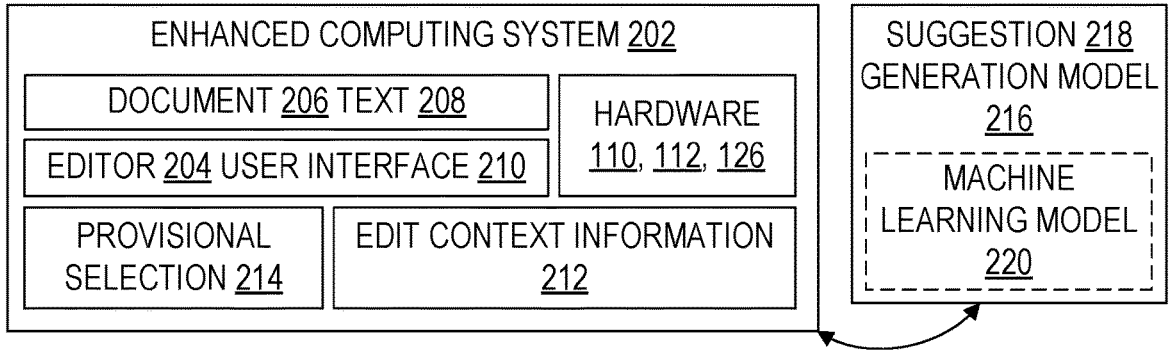
FIG. 2 is a block diagram illustrating aspects of a computing system which has one or more of the edit automation enhancements taught herein.

FIG. 2 illustrates a computing system 102 configured by one or more of the edit automation enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. The illustrated system 202 includes hardware such as a processor 110, memory 112, and display 126, as well as one or more I/O device peripherals 106 such as a keyboard, mouse, microphone, or speakers.

The illustrated system 202 includes an editor 204, which may be, for example, any tool 122 that has editing functionality of the kind taught herein. A document 206 containing text 208 may be brought from a file, blob, etc. of a disk, server, storage resource, or other machine, etc. into the editor 204 for editing. Editing occurs in response to input received through a user interface 210. The document 206 may be displayed on the screen 126 by operation of the user interface 210. The illustrated system 202, and in particular the editing tool 204, is enhanced by the presence and operation of innovative functionality that performs edit automation as taught herein.

In particular, edit context information 212 which includes at least one provisional selection 214 is submitted to a model 216 that generates edit suggestions 218. Herein the term "suggestion" indicates either or both of two categories of suggestion—those which are driven by provisional selection, and those which are not. Some suggestions 218 are generated by a suggestion generation model 216 that is driven at least in part by provisional selections 214; changing the provisional selection generally changes the suggestions generated. Other suggestions 218 may be created in other ways that are not driven by provisional selection, e.g., by an autocompletion functionality that uses static analysis (including the current location of the text insertion point), a catalog of API identifiers, and a list of program language reserved words, without a dependence on provisional selections 214.

In some embodiments, the suggestion generation model 216 may include, for example a neural network, a deep learning network, or other machine learning model 220 trained on data gathered from editing sessions. In addition, or instead, suggestion generation model 216 may include a synthesizer that is equipped with Microsoft PROSE™ technology or another program synthesis technology to synthesize edit suggestions (mark of Microsoft Corporation). In some embodiments, the suggestion generation model 216 may include a list of code snippets, or a list based on API documentation. More generally, the suggestion generation model 216 may include one or more learning machine models 220 or other components, static or dynamic or both.

One suitable machine learning model 220 includes a neural transformer model having multiple decoder blocks. A decoder block includes a multi-head self-attention layer coupled to a multi-layer one-dimensional convolutional neural network. Layer normalization is applied before and after the multi-head self-attention layer in order to reduce the training time of the neural transformer model. A beam search is used to generate candidate sequences. The beam search uses the top k subtokens/tokens, identified from each iteration of the neural transformer model, to expand a partial candidate sequence of tokens/subtokens likely to complete a line of source code. The beam search generates a search tree but only keeps the top k nodes at each inference level to expand the search. The search ends when the end-of-line token appears as the most probable prediction. A token is a single element in a grammar of a programming language, such as a keyword, variable name, operator, delimiter, etc.

Figure 3:
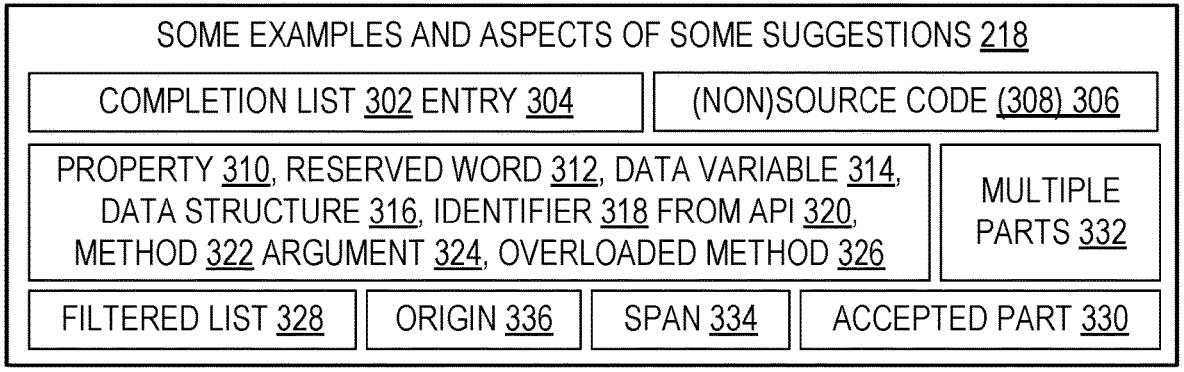
FIG. 3 is a block diagram illustrating some examples and some aspects of some automatically generated text editing suggestions.

FIG. 3 shows some examples of edit suggestions 218 and some aspects of some edit suggestions 218. This is not a comprehensive summary of all suggestion 218 aspects or of every suggestion 218. These items are discussed at various points herein, and additional details regarding them are provided in the discussion of a List of Reference Numerals later in this disclosure document.

FIGS. 4 through 11 illustrate text suggestion and editing operations and results using a stylized user interface 400. These operations and results are discussed at various points herein, including under a heading "Processes (a.k.a. Methods)", but it will be understood that they are also relevant to systems 202 because a system 202 may be equipped and configured to perform such operations and produce such results.

Figure 12:
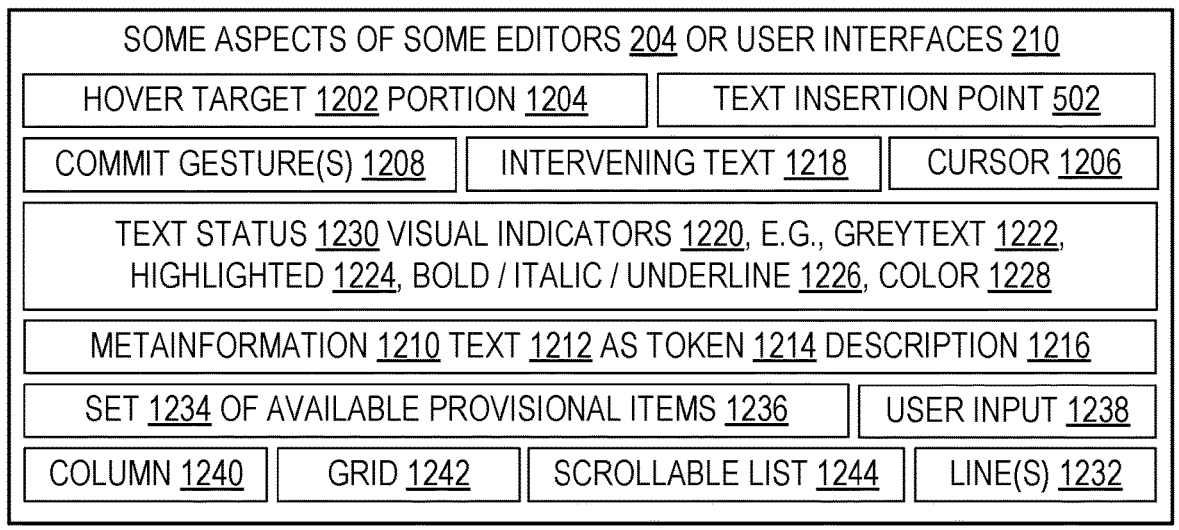
FIG. 12 is a block diagram illustrating some aspects of some editors or user interfaces or both.

FIG. 12 shows some aspects of some editors 204 and some aspects of some editor user interfaces 210. This is not a comprehensive summary of all editor aspects or user interface aspects, or of every editor or every editor user interface. These items are discussed at various points herein, and additional details regarding them are provided in the discussion of a List of Reference Numerals later in this disclosure document.

Some embodiments use or provide a functionality-enhanced system, such as system 202 or another system 102 that is enhanced as taught herein. In some embodiments, an enhanced system is configured to display text suggestions which change according to provisional selections from a user during an editing session. This enhanced system includes a digital memory 112, a processor 110 in operable communication with the memory, a display device 126, and an editor 204 having a user interface 210. The digital memory is configurable to contain a document 206, with the document including document text 208. Upon execution with the processor, the user interface 210 displays at least a portion of the document on the display device. The user interface shows, defines, or otherwise includes a text insertion point 502. The digital memory 112 may be volatile or nonvolatile or a mix.

The processor 110 is configured to perform editing automation steps. The steps include automatically (a) submitting 1304 edit context information 212 to a suggestion generation model 216, the edit context information including a provisional selection 214 of displayed text that is not necessarily part of the document (e.g., a provisionally selected completion list entry text that is not yet part of the document, or a provisionally selected hover target text that is part of the document), (b) getting 1306 from the suggestion generation model a text suggestion 218 which is based at least in part on the provisional selection, and (c) displaying 1308 the text suggestion near the text insertion point 502. Some embodiments throttle displaying 1308 of different suggestions, to avoid a flashing sequence of different suggestions as a user types. Throttled displaying may be done, e.g., by displaying 1308 a different suggestion at most once every M seconds, with M being in the range of one to ten, and in some embodiments M being at least three.

Herein, a suggestion is deemed "near" a text insertion point if any part of the suggestion is within a circle of radius R centered at the center of the text insertion point, where R is ten times a font height of a font in which the suggestion is displayed. More generally, a displayed text item X is "near" a point C when any part of X is within a circle of radius R centered at point C, where R is ten times a font height of a font in which X is displayed.

In some embodiments, the document text includes source code 306, and the provisional selection 214 includes at least one of the following: a user-indicated entry 304 in a completion list 302 which includes source code method 322 suggestions 218; a user-indicated entry 304 in a completion list 302 which includes source code property 310 suggestions 218; a user-indicated entry 304 in a completion list 302 which includes source code reserved word 312 suggestions 218; a user-indicated entry 304 in a completion list 302 which includes source code data variable 314 suggestions 218; a user-indicated entry 304 in a completion list 302 which includes source code data structure 316 suggestions 218; a user-indicated entry 304 in a completion list 302 which includes source code identifiers 318 from one or more application program interface 320 suggestions 218; a user-indicated entry 304 in a completion list 302 which includes source code method argument 324 suggestions 218; or a user-indicated entry 304 in a completion list 302 which includes source code overloaded method 326 suggestions 218.

Some or all of a given document's text 208 may also be non-source code 308, e.g., natural language prose that is not contained in a source code comment. In addition to containing text 208, documents 206 may contain images. Text 208 includes, but is not limited to, alphanumeric characters. Symbols, kanji, widgets, icons, emojis, and all other non-alphanumeric characters are considered to be text 208 if they belong to a font, e.g., a Unicode® font (mark of Unicode, Inc.). Any character or other glyph that belongs to a Unicode® font is text 208.

In some embodiments, the edit automation steps include producing 1404 a filtered completion item list 328, 302 by filtering a set of source code completion items 304, and the provisional selection includes a user-indicated entry 304 in the filtered completion item list 328. For example, a completion list may be filtered to include or exclude methods, classes, items from a current project, fields, keywords, and so on, including combinations of these filters.

In some embodiments, the edit automation steps include detecting 1430 that a cursor is hovering 1432 over a hover target portion 1204 of the document text, and the provisional selection includes at least part of the hover target portion 1204. The hover target may be a particular screen coordinate location or set of screen coordinates designated by a cursor, for example. The hover target portion may be a character, word, clause, sentence, paragraph, or other portion of the displayed text which is near the hover target under the definition of "near" provided herein. The extent of the portion 1204 varies according to the embodiment involved, and may also vary according to how a particular embodiment is configured, e.g., a default portion may be a word, and may be expanded to a paragraph by an additional gesture 1208.

Figure 9:
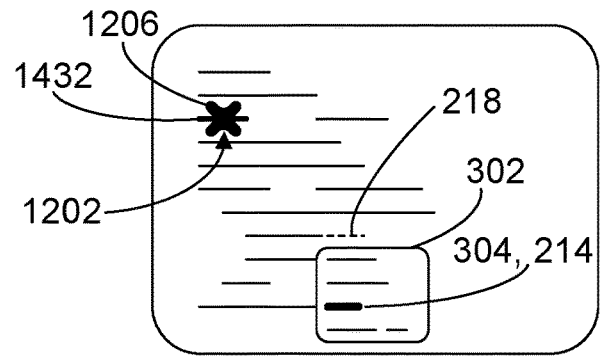
FIG. 9 shows the document text and user interface of FIG. 7 in an alternative configuration, with a cursor hovering over a target portion of the document text and a suggestion text that corresponds to the target portion being displayed at the text insertion point.

For example, FIG. 9 shows a hover target 1202 indicated by a mouse cursor 1206, and also shows a completion list 302 in which one entry 304 has been provisionally selected 214. In this situation, the edit context information 212 submitted to a suggestion generator 216 may include the provisionally selected entry, may include the text word or other portion 1204 indicated by the cursor, or may include both pieces of data, depending on the embodiment and possibly on how the embodiment is configured.

In some embodiments, the edit automation steps include committing 1310 the text suggestion. Committing 1310 includes receiving 1406 an acceptance of at least a part of the text suggestion, designating 1408 the part of the text suggestion as an accepted part 330, and altering 1410 the document text to include a copy of the accepted part.

Figure 7:
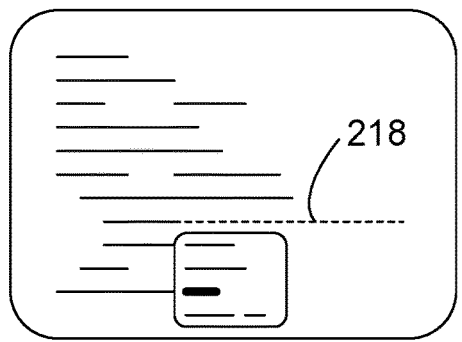
FIG. 7 shows the document text and user interface of FIG. 6, with a different entry of the completion list provisionally selected and a corresponding different suggestion text displayed.
Figure 8:
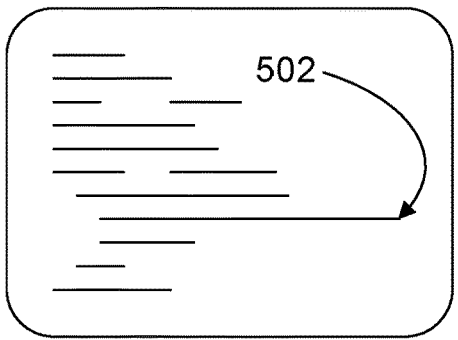
FIG. 8 shows the document text and user interface of FIG. 7, after the provisional selection was accepted and the corresponding different suggestion text was placed in the document text.

For example, FIG. 7 shows a provisional-selection-driven text suggestion 218 (indicated by the dashed line segment) which has not been committed. FIG. 8 shows the altered document after that text suggestion has been committed; the solid line segment in FIG. 8 accordingly replaces the dashed line segment of FIG. 7. In this example, the commitment 1310 includes receiving 1406 an acceptance in the form of a commit gesture 1208, e.g., a tab key press, an enter key press, or a mouse button click. In this example, designating 1408 the suggestion as an accepted part and altering 1410 the document are both accomplished by executing software that inserts 1412 a copy of the suggestion into the document at the insertion point, and replaces the display of the suggestion string with a display of the inserted copy. As feedback to improve suggestion generation, data designating 1408 the suggestion as accepted may also be submitted 1304 to the suggestion generator. To reflect editing, the display 126 appearance changes from visually indicating a suggestion (e.g., as a dashed line segment in the Figures, as grey text 1222 in an embodiment) to visually indicate that some or all of the suggestion text is now part of the document (e.g., as a solid line segment in the Figures, and as solid black text in an embodiment).

Other system embodiments are also described herein, either directly or derivable as system versions of described processes or configured media, duly informed by the extensive discussion herein of computing hardware.

Although specific edit automation architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, visual indications, user interface mechanisms, operational sequences, data structures, or other functionalities for instance, and may otherwise depart from the examples provided herein.

Processes (a.k.a. Methods)

FIGS. 4 through 11 illustrate operational sequences, which may be part of process embodiments or be performed by system embodiments, for example. FIG. 4 shows a stylized user interface 210 containing document text 208. The text 208 is represented in the Figures by line segments, because the particular fonts, font sizes, colors, natural language texts, and programming language texts used may vary in an embodiment or vary across embodiments. The text 208 may be read from a file, may be entered by typing or by pasting, may be entered through suggestion acceptance and commitment, or (perhaps most likely) may be created through a combination of these and other operations.

FIG. 5 shows the document text and user interface of FIG. 4, with a completion list 302 displayed to assist editing at a text insertion point 502. The completion list may be created by technology such as IntelliSense® or IntelliCode™ autocompletion, for example (marks of Microsoft Corporation).

In a system 102 that is equipped with such autocompletion technology but is not equipped with provisional-selection-driven suggestion generation as taught herein, there might be no text displayed immediately after the text insertion point. This approach has the appearance illustrated in FIG. 5.

However, one of skill informed by the teachings herein may also envision a system that is equipped to display both categories of suggestion: those whose generation 1434 was driven by provisional selection, and those whose creation did not depend on provisional selection. In such a system 202, the suggestion based on provisional selection could be displayed near the text insertion point and on the same line, as shown in FIG. 6, or the suggestion could be displayed near the text insertion point but not necessarily on the same line.

In particular, the suggestion based on provisional selection could be displayed near the text insertion point but as an entry in the completion list instead of on the same line. If no visual distinction is made between completion list entries 304 according to whether or not they were generated 1434 using provisional selection, then the appearance illustrated in FIG. 5 would also match this alternative embodiment. A visual distinction could instead be made, e.g., by displaying the provisional-selection-based suggestion in bold or in a different color than the other list entries.

Figure 6:
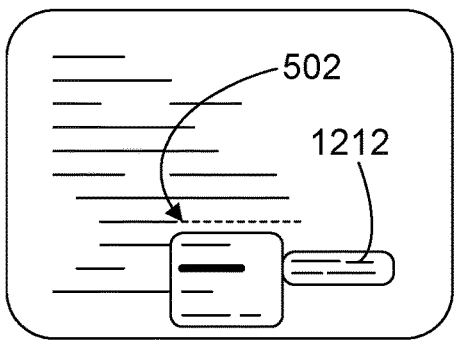
FIG. 6 shows the document text and user interface of FIG. 5, with an entry of the completion list provisionally selected and a corresponding suggestion text displayed.

FIG. 6 shows the document text and user interface of FIG. 5, with an entry of the completion list provisionally selected and a corresponding suggestion text displayed. The provisionally selected entry is indicated in this diagram as a thicker line segment, but in an embodiment the entry could be highlighted 1224 or shown in a different color 1228 or otherwise visually indicated 1220 to show its status 1230, for example. The provisional-selection-based suggestion text is indicated in the Figures as a dashed line segment.

Thus, one operational sequence includes opening a file for editing (FIG. 4), reaching a text insertion point at which a completion list is displayed (FIG. 5), and provisionally selecting an entry of the completion list (FIG. 6). As a consequence of the provisional selection, edit context information 212 including the provisional selection is submitted 1304 to a suggestion generator 216, a provisional-selection-based suggestion is gotten 1306 from the suggestion generator, and the provisional-selection-based suggestion is displayed 1308 near the text insertion point (also shown in FIG. 6).

To illustrate another aspect of some embodiments, FIG. 6 also shows a metainformation text 1212 displayed next to the provisionally selected entry. The metainformation text 1212 includes a description 1216 of one or more tokens 1214 of source code corresponding to the provisionally selected entry. For instance, the description may include metainformation 1210 such as the name of a method, the method's list of expected arguments, and a short statement of the method's intended purpose. The metainformation text 1212 may be provided by functionality such as Visual Studio® IntelliSense® List Members, Parameter Info, or Quick Info functionality, for example (marks of Microsoft Corporation). In some embodiments hovering a cursor 1206 over metainformation text 1212 performs a provisional selection, so that some or all of the displayed metainformation text 1212 is submitted 1304 to the suggestion generator 216 as edit context information. For clarity of illustration this is not shown in FIG. 6, but a hovering cursor is shown in FIG. 9.

FIG. 7 continues the operational sequence illustrated in FIGS. 4 through 6. After an entry of the completion list is provisionally selected and a corresponding provisional-selection-based suggestion is displayed (FIG. 6), a different entry of the completion list is provisionally selected and a corresponding different suggestion text is displayed (FIG. 7). This illustrates dependence of the displayed suggestion 218 on the provisional selection 214. This dependence is missing from systems 102 that do not generate 1434 suggestions based partially (or entirely) on a current provisional selection 214.

FIG. 8 continues the operational sequence illustrated in FIGS. 4 through 7. This operational sequence is shown by FIGS. 4, 5, 6, 7, and 8 in that order. FIG. 8 shows the document text after the most recent provisional selection was accepted 1406 and the corresponding different suggestion text 218 was placed 1410 in the document text. In the Figures, this is represented by replacing the dashed line segment (suggestion) with a solid line segment of the same length (suggestion committed as document text). In an embodiment, the appearance of the displayed text would change, e.g., from grey text to solid text.

FIG. 9 shows an operational sequence variation. In this example the operational sequence is shown by FIGS. 4, 5, 6, 7, and 9, in that order. As with other operational sequences discussed herein, there may be intervening operations that are not necessarily shown in the Figures. Implied or presumed operations such as opening the file for editing (FIG. 4) may also be omitted from some examples.

In FIG. 9, a cursor 1206 is hovering over a target portion 1204 of the document text. This is treated as provisional selection edit context information 212, and is submitted 1304 to the suggestion generator 216. As a result, the provisional-selection-based suggestion 218 displayed in FIG. 9 is different than the provisional-selection-based suggestion 218 displayed in FIG. 7, even though the same completion list entry is provisionally selected in both Figures. The difference in suggestions is shown in the two Figures by different lengths of dashed line segment. In an embodiment, the two suggestions might be text strings of different lengths, or they could coincidentally have the same length but have different content. In some but not all cases that treat hovering as edit context information, the hovering might not alter what suggestion is generated.

Figure 10:
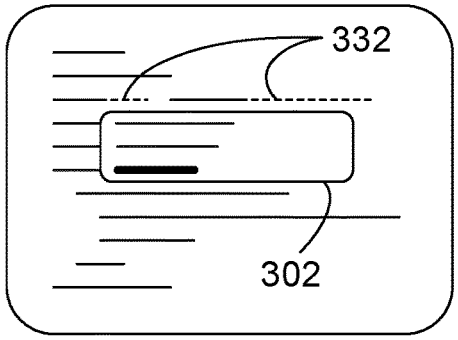
FIG. 10 shows the document text and user interface of FIG. 4, with another completion list and a multi-part suggestion text displayed.

FIG. 10 shows another operational sequence variation. In this example an operational sequence is shown by FIGS. 4 and 10, in that order. FIG. 10 shows a different completion list than the completion list of FIGS. 5, 6, 7, 9, and 11. FIG. 10 also shows a two-part 332 suggestion text being displayed. This two-part suggestion may also be viewed as a set of two related suggestions.

As an example, the user interface could display the following:
import socket
s=socket.socket(socket.AF_INET, socket.SOCK_STREAM)
s.connect(("127.0.0.1", 0)) ↵ ▫ to accept|", 0))

In this example, document text is shown in bold, and the generated 1434 suggestion is "127.0.0.1", 0))\r\n", which is not bolded. The document text includes both "s.connect ((""and"", 0))". The \r\n return character—an arrow pointing down and then left—is part of a provisional-selection-driven suggestion 218. The right arrow block and the words "to accept" are not part of the document, and also not part of the suggestion text per se; they are an aid to the user indicating that the gesture to accept the suggestion is to press the right arrow key. The text insertion point is indicated by the vertical bar |. The text insertion point in this example is at the end of the suggestion, as opposed to the beginning; either position may be used, depending on the embodiment and configuration employed.

As an alternative, the user interface could display the following:
import socket
s=socket.socket(socket.AF_INET, socket.SOCK_STREAM)
s.connect(("127.0.0.1|", 0)) ↵ ▫ to accept In this alternative, the text insertion point is different. The generated 1434 suggestion is in two parts: "127.0.0.1" and the suggested return character. The document text " ", 0))" is intervening text 1218, 208 between the two suggestion parts (or equivalently, between two related suggestions). As another example of intervening text, an embodiment might insert suggestion text between typed text, e.g., for autocompletion or spelling correction. For instance, in an example text "Console.WriteLine(args)" the "W" and the "L" could be characters typed by a user, and the rest of the example text could be generated suggestion text.

As a practical matter, a distinction between a single suggestion 218 that has multiple parts and a set of multiple related suggestions 218 may be deemed merely a matter of implementation detail choice, or a terminology preference. Accordingly, they are treated herein as equivalent. One of skill will readily convert a multiple part suggestion example to an example involving multiple related suggestions, and vice versa. Likewise, one of skill will readily apply to a multiple part suggestion any teachings given herein involving multiple related suggestions, and vice versa.

Multi-part text suggestions, or equivalent sets of multiple related text suggestions, may arise in at least two kinds of situation: situations with intervening document text, and situations with staged acceptance. FIG. 10 shows a situation with document text intervening between two parts 332 of a suggestion (or equivalently, between two related suggestions).

Figure 11:
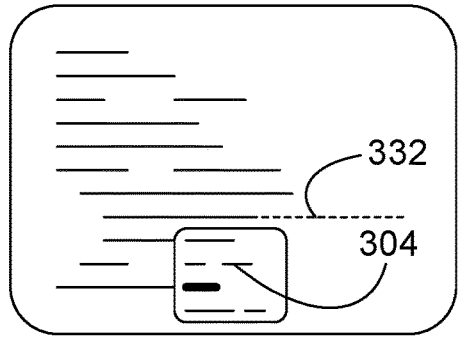
FIG. 11 shows the document text and user interface of FIG. 7, with the completion list modified and with a part but not all of the suggestion text committed.

FIG. 11 shows another operational sequence variation. In this example an operational sequence is shown by FIGS. 4, 5, 6, 7, and 11, in that order. FIG. 11 shows a staged acceptance situation after a first acceptance of a leftmost part of a suggestion, or equivalently, after the acceptance of a first suggestion in a set of related suggestions. In this example, the change in edit context information (e.g., different document text due to the acceptance, and different text insertion point) causes a change in the completion list. This completion list change is shown in the Figures for respective entries above the provisionally selected entry; there are two line segments in the FIG. 11 entry versus one line segment in the FIG. 7 entry. However, staged acceptance does not necessarily change any completion list entries.

As an example of staged acceptance, suppose a provisional selection has been made, and suppose a text insertion point 502 | and a generated 1434 suggestion 218 are as shown below, where document text in this example is non-italic and the suggestion text 218 is in italics and bold (the inconsistent use of bold 1226 in some examples is intentional, to emphasize that embodiments may use various visual indicators 1220):
Console.|BackgroundColor=System.Drawing.Color.White;

Although not shown in this particular example, different parts 332 of a suggestion, or different suggestions of a set of related suggestions, could be distinguished visually from one another, e.g., by coloring, to show a user which part will be accepted next. In some embodiments, different parts 332 (or different suggestions of a related set) can be separately selected, e.g., by mouse double click, and the selection will be accepted next. In a system 202 equipped for staged acceptance, the user might then accept a first part of the suggestion (or equivalently the first suggestion of a set), resulting in:
Console.BackgroundColor=|System.Drawing.Color.White;

The user might then reject the rest of the suggested text, yielding:
Console.BackgroundColor=getChosenColor( );|

Alternatively, the user might accept more but not all of the initial suggestion, leading first to this:
Console.BackgroundColor=System.Drawing.Color.|White;

And then after typing an override string, to this:
Console.BackgroundColor=System.Drawing.Color. LightYellow;|

Some embodiments that implement staged acceptance avoid reliance on two or more commit characters 1208. For instance, they avoid recognizing one character as a command to commit an entire line of suggestion when a different character would be recognized as a command to commit less. Some embodiments avoid recognizing one character as a command to commit a provisional-selection-driven suggestion when a different character would be recognized as a command to commit another kind of suggestion, e.g., a completion list entry. Having a single commit gesture may be easier for users.

In the FIG. 10 situation, and others, acceptance could be staged, or instead acceptance could be all-or-nothing. That is, the embodiment and situation might support a staged acceptance sequence which allows a user to accept the leftmost suggestion part or the rightmost suggestion part separately from the other suggestion part. Or the embodiment and situation might not be staged, in that the user can only accept or reject both parts together.

Figure 13:
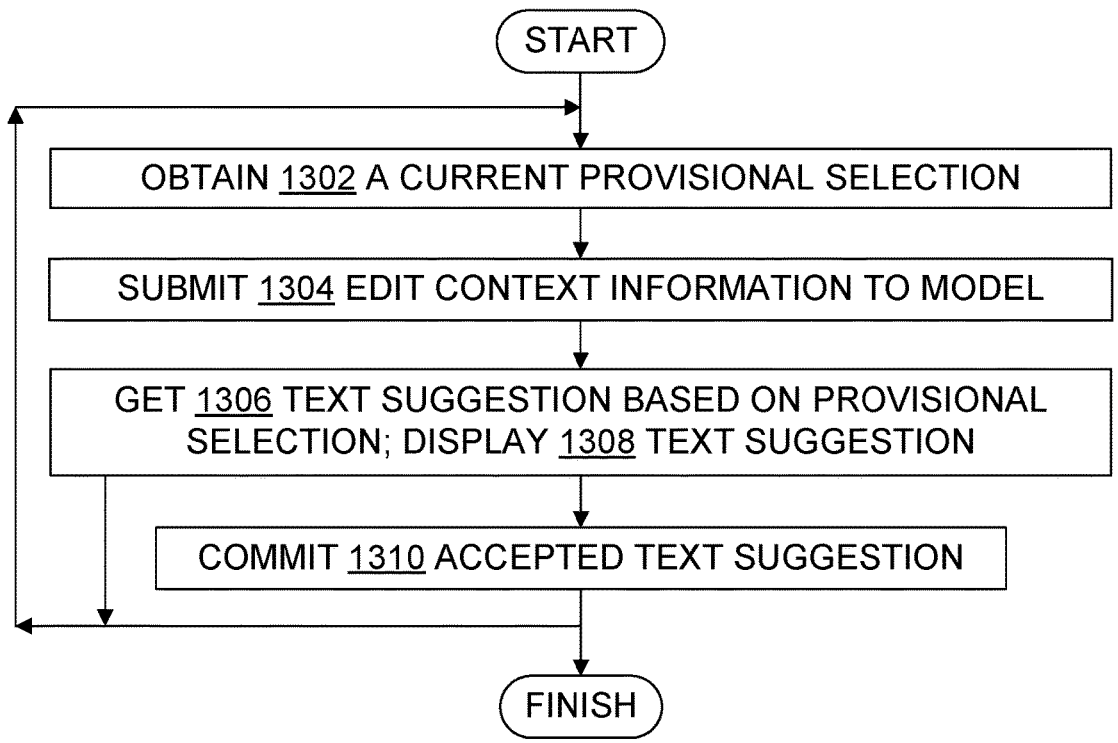
FIG. 13 is a flowchart illustrating steps in some edit automation methods.
Figure 14:
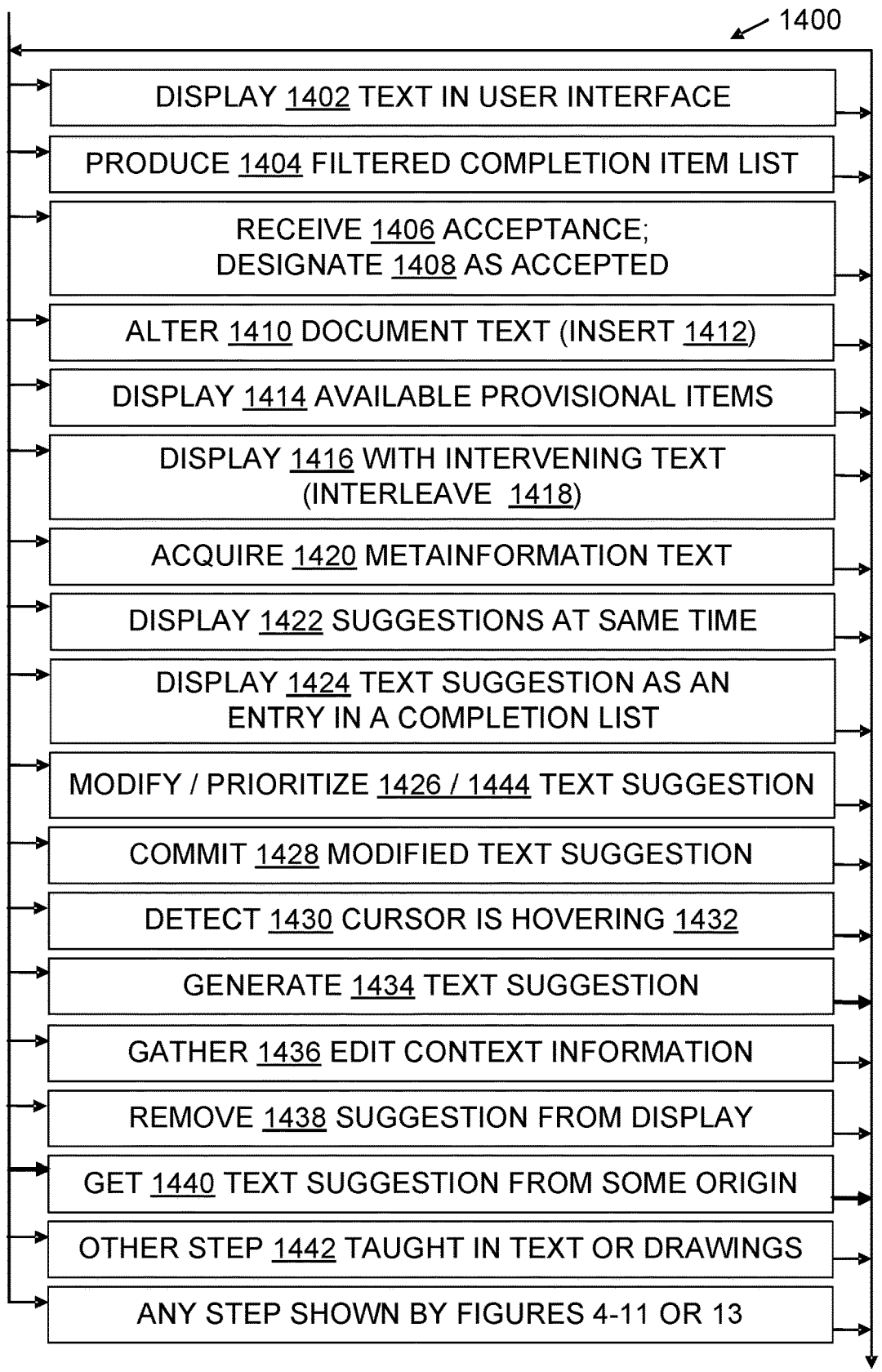
FIG. 14 is a flowchart further illustrating steps in some methods for edit automation, incorporating FIG. 13 and steps illustrated by FIGS. 4 to 11.

FIG. 13 illustrates a family of methods 1300 that may be performed or assisted by an enhanced system, such as system 202 or another edit automation functionality enhanced system as taught herein. FIG. 14 further illustrates edit automation methods (which may also be referred to as "processes" in the legal sense of that word) that are suitable for use during operation of a system which has innovative functionality taught herein. FIG. 14 includes some refinements, supplements, or contextual actions for steps shown in FIGS. 4 through 11 and 13, and incorporates the steps of those Figures as options.

Technical processes shown in the Figures or otherwise disclosed will be performed automatically, e.g., by an enhanced editor 204, unless otherwise indicated. Processes may also be performed in part automatically and in part manually to the extent action by a human person is implicated, e.g., in some embodiments a human may manually move a mouse to guide positioning of a cursor 1206 or type keys to guide insertion of text 208, but no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 13 and 14. Steps may be performed serially, in a partially overlapping manner, or fully in parallel. In particular, the order in which flowchart 1300 or 1400 action items are traversed to indicate the steps performed during a process may vary from one performance of the process to another performance of the process. The flowchart traversal order may vary from one process embodiment to another process embodiment. Operational sequences may differ from those shown in FIGS. 4 through 11. Steps may also be omitted, combined, renamed, regrouped, be performed on one or more machines, or otherwise depart from the illustrated flow, provided that the process performed is operable and conforms to at least one claim.

Some embodiments use or provide editing method suitable for performance by a system, including methods which provide updated text suggestions 218 as a user changes provisional selections 214 during a document editing session. Some methods include the following steps: obtaining 1302 via a user interface a first provisional selection; submitting 1304 the first provisional selection to a suggestion generation model; getting 1306 from the suggestion generation model a first text suggestion which is based at least in part on the first provisional selection; displaying 1308 the first text suggestion; obtaining 1302 via a user interface a second provisional selection; submitting 1304 the second provisional selection to the suggestion generation model; getting 1306 from the suggestion generation model a second text suggestion which is based at least in part on the second provisional selection; removing 1438 the first text suggestion from being displayed; and displaying 1308 the second text suggestion. This is shown, e.g., in the operational sequence illustrated by FIGS. 6 and 7.

Some embodiments include receiving 1406 an acceptance of a part of the second text suggestion, the part 330 being less than all of the second text suggestion, and then inserting 1412 the part into the document text. This is shown, e.g., in the operational sequence illustrated by FIGS. 7 and 11.

In some embodiments, the second text suggestion spans 334 more than one line 1232 of text. This would be shown, for instance, in any of FIG. 6, 7, 9, or 11 if the single dashed line segment were replaced by two or more dashed line segments on two or more consecutive display lines 1232.

In some embodiments, at least one of the text suggestions includes a multi-part text suggestion having at least two parts 332, and the method displays the two parts with an intervening portion 1218 of document text displayed between the two parts. This is shown, e.g., in FIG. 10.

Some embodiments include getting 1306 from the suggestion generation model a third text suggestion which is also based at least in part on the second provisional selection; and displaying 1308 the third text suggestion at the same time as displaying the second text suggestion. This is shown, e.g., in the operational sequence illustrated by FIGS. 6, 7, and 9, or the operational sequence illustrated by FIGS. 6, 7, and 11.

Some embodiments include acquiring 1420 metainformation text which includes a natural language description of a token that is represented by at least a part of the second text suggestion; and displaying 1402 the metainformation text at the same time as displaying 1308 the second text suggestion (e.g., as shown in FIG. 6).

Some embodiments include getting 1440 a third text suggestion from an origin 336 which is not the suggestion generation model 216; and displaying 1422 the third text suggestion at the same time as displaying 1308 the second text suggestion. Assuming the completion list entries 304 do not originate 336 at the suggestion generator 216, this situation would be shown in FIG. 7 or FIG. 11, with the second text suggestion shown as a dashed line segment and the third text suggestion shown as a completion list entry.

Some embodiments include committing 1310 the second provisional selection upon receiving a first instance of a commit gesture; and then committing 1310 at least a part of the second text suggestion upon receiving a second instance of the commit gesture. Committing 1310 a second provisional selection upon receiving a first instance of a commit gesture is shown by FIGS. 7 and 8. Committing 1310 at least a part of the second text suggestion upon receiving a second instance of the commit gesture is shown by FIGS. 7 and 11.

In some embodiments, the provisional selection corresponds to an item in a set 1234 of available provisional items 1236, and method includes displaying 1414 at least a portion of the set of available provisional items. This is illustrated in FIGS. 6, 7, 9, 10, and 11, with the provisional items 1236 being completion list entries 304. This is also illustrated in FIG. 9 with the provisional items 1236 being characters, words, or other displayed text 208.

Some embodiments include modifying 1426 the second text suggestion based on user input 1238, and then committing 1310 the second text suggestion as modified. For example, in a variation of the operational sequence shown in FIGS. 7 and 8, the suggestion indicated by the dashed line segment in FIG. 7 could be modified 1426 by user actions before being committed 1310. The same document text would perhaps result if the same edits 1426 were done after the unmodified suggestion was committed, but the order of operations could make a difference in some embodiments. For instance, edited non-committed text might be a feedback signal to the suggestion generator in an embodiment in which edited committed text (and other document text 208) is not used for such feedback. Manually editing a suggestion may drive automatic refinements to the suggestion.

Some embodiments include detecting 1430 that a cursor is hovering 1432 over a hover target, and the provisional selection corresponds to at least a part of the hover target. This is illustrated in FIG. 9.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as provisional selections 214, edit context information 212, suggestion generation models 216, completion lists 302, suggestions 218, suggestion parts 332, hover targets 1202, text status visual indicators 1220, and enhanced editors 204, in the form of data 118 and instructions 116, read from a removable storage medium 114 and/or another source such as a network connection, to form a configured storage medium. The configured storage medium 112 is capable of causing a computer system 102 to perform technical process steps for edit automation, as disclosed herein. The Figures thus help illustrate configured storage media embodiments and process (a.k.a. method) embodiments, as well as system and process embodiments. In particular, any of the process steps illustrated in FIGS. 4 through 11, 13, or 14, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform an editing method which provides updated text suggestions as a user changes provisional selections during a document editing session. This method includes: obtaining 1302 via a user interface a first provisional selection; submitting 1304 the first provisional selection to a suggestion generation model 216 which includes a machine learning model 220; getting 1306 from the suggestion generation model a first text suggestion which is based at least in part on the first provisional selection; displaying 1308 the first text suggestion; obtaining 1302 via a user interface a second provisional selection; submitting 1304 the second provisional selection to the suggestion generation model; getting 1306 from the suggestion generation model a second text suggestion which is based at least in part on the second provisional selection; removing 1438 the first text suggestion from being displayed; and displaying 1308 the second text suggestion.

In some embodiments, the second text suggestion spans 334 more than one line of text. In some embodiments, the method includes getting 1306 at least two text suggestions from the machine learning model, and displaying 1422 the at least two text suggestions interleaved 1418 with document text 208.

In some embodiments, the second text suggestion is displayed 1424 as an entry in a completion list. This would be illustrated, e.g., in a variation of FIG. 5 in which one of the entries 304 is shown as a dashed line segment to indicate it is a provisional-selection-based suggestion 218.

In some embodiments, the provisional selection corresponds to an item in a set 1234 of available provisional items, and method includes at least one of the following: displaying 1402 a column 1240 of available provisional items; displaying 1402 a grid 1242 of available provisional items; or displaying 1402 a scrollable list 1244 of available provisional items. FIGS. 5, 6, 7, 9, 10, and 11 each display 1402 a column 1240 of available provisional items in the form of a completion list 302. Variations of these Figures would illustrate displays of entries 304 arranged in a scrollable list (e.g., a scrollable column) or in a grid (e.g., a two column array of entries).

Additional Examples and Observations, Generally

Additional support for the discussion of edit automation herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, additional examples and observations are offered.

Some embodiments use or provide completions-driven predictions, by displaying multi-token completions for code authoring using a combination of a completions list and inline text suggestion. One of skill will acknowledge that software developers spend a lot of time authoring code and have been offered various auto-completion tools over the years. Some approaches include machine learning-driven suggestions for autocompletion, which have begun to span multiple tokens, right up to whole lines of code. Such multi-token completions have been displayed to the user via either a completions list entry or via inline text shown on a line of code where the developer's editing caret is located. These locations each offer their own separate advantages.

However, some whole line completion approaches combine the best of both display options. In some, the completions list is used to indicate user intent to the whole line completions model, allowing the user a smooth exploration of the possible completions.

For instance, suppose a developer is working to write the line of code:

Console.Write(someStringVariable);

A full line prediction when the insertion point reached the "." of Console might be:

Console.WriteLine(someStringVariable);

But this does not match the developer's intent. The developer uses a completions list, which includes a recommendation of .Write, to indicate the direction they are going in (a desire to use .Write), and as the developer browses the list to Write they would see the full line recommendation change, to show the best model item that includes .Write, such as:

Console.Write(someStringVariable),

Then the developer could quickly select this suggestion. In this way, the completions list allows a fuller exploration of the full-line completion model's contents with the fewest possible keystrokes, driven by the developer's indicated intent from the selection in the completions list.

One technical advantage of some embodiments is that other methods of display (completions list only, and inline text only) cannot allow as fluid or complete an exploration of the potential completions with as few keystrokes or other gestures. Inline text only can only display the predictions for the text up to the user's insertion caret, and can't have any way to display other options since it is inherently showing only one prediction at a time. A traditional completions list can display more than one prediction, but using it forces the user to parse many if not all of those prediction entries in order to make a selection, increasing cognitive load. By contrast, some embodiments allow more than one prediction to be displayed quickly and easily, with suggestions driven by the user's nascent indication of their intent by means of their browsed selection (provisional selection) in the completions list.

Another technical advantage is that the predictions (suggestions) from the model do not need to be as tightly focused on a single choice as with the inline text only approach. Some models 216 produce more predictions than prior approaches could effectively surface to a user in a single grey text line. With the benefit of user interface examples and other teachings provided herein, multiple competing suggestions can be displayed in turn as the provisional selection changes, e.g., as the user scrolls through the completion list or hovers over different text, or both. This also reduces pressure on the suggestion generator to be 100% accurate in predicting what a user wants.

Technical Character

The technical character of embodiments described herein will be apparent to one of ordinary skill in the art, and will also be apparent in several ways to a wide range of attentive readers. Some embodiments address technical activities such as altering 1410 digital text 208, computationally gathering 1436 edit context information and electronically submitting 1304 it to a suggestion generator 216, displaying 1402 text 208, 218, 1212 in an editing tool 204, and visually indicating 1220 text status 1230 on a computing system display 126, which are each an activity deeply rooted in computing technology. Some of the technical mechanisms discussed include, e.g., machine learning models 220, completion lists 302, user interfaces 210, user interface gestures 1208, scrollable lists 1244, and filtered lists 328. Some of the technical effects discussed include, e.g., displays 1422 of in line suggestions 218 and completion list suggestions 304 at the same time (overlapping display periods, not necessarily identical), generation 1434 of edit suggestions 218 based on provisional selections 214, displays 1416 of suggestions interleaved 1418 with document text 208, and staged acceptance of part 332 of a suggestion or of one suggestion from a set of related suggestions 218. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as availability, awareness, ease, efficiency, or user satisfaction, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically generate text editing suggestions and effectively present them to someone who is using an editor. Other configured storage media, systems, and processes involving availability, awareness, ease, efficiency, or user satisfaction are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, time period examples, software processes, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
LAN: local area network
OS: operating system
PaaS or PAAS: platform-as-a-service
RAM: random access memory
ROM: read only memory
SIEM: security information and event management; also refers to tools which provide security information and event management
TPU: tensor processing unit
UEFI: Unified Extensible Firmware Interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Edit automation operations such as obtaining 1302 a provisional selection 214, gathering 1436 edit context information 212, submitting 1304 edit context information 212 to a suggestion generator 216, generating 1434 suggestions 218, 304, altering 1410 document text 208, and many other operations discussed herein, are understood to be inherently digital. A human mind cannot interface directly with a CPU or other processor, or with RAM or other digital storage, to read and write the necessary data to perform the edit automation steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accepting, acquiring, altering, committing, designating, detecting, displaying, editing, filtering, gathering, generating, getting, hovering, indicating, inserting, interleaving, modifying, obtaining, producing, receiving, removing, submitting (and accepts, accepted, acquires, acquired, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., user of an enhanced system 202

106 peripherals 108 network generally, including, e.g., LANs, WANs, software-defined networks, clouds, and other wired or wireless networks 110 processor 112 computer-readable storage medium, e.g., RAM, hard disks 114 removable configured computer-readable storage medium 116 instructions executable with processor; may be on removable storage media or in other memory (volatile or nonvolatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 system 102 enhanced with edit automation functionality, e.g., functionality to perform any operation or operational sequence shown in any of the Figures and first described herein 204 editor software, e.g., a tool 122 or application 124 enhanced with edit automation functionality 206 digital document, e.g., word processor document, spreadsheet document, source code document, or other document in digital (computer-readable and software-editable) format; may include text, graphics, sound, etc.

208 text in a document, as opposed for example to suggestion text 218, 304 or metainformation text 1212

210 user interface generally; part of an editor 204; software 212 digital edit context information, e.g., one or more of: some or all of the document text 208, current location of the insertion point 502, current hover target 1202 or corresponding targeted portion 1204 or both, current provisional selection 214

214 provisional selection, e.g., text which is a focus of attention, e.g., due to being hovered over or due to being highlighted etc. in a completion list; also refers to operation of provisionally selecting an item 216 suggestion generation model, also referred to as "suggestion generator"; computational 218 suggestion of text for altering document text 208; may also be referred to as a "recommendation" or a "prediction"; a suggestion 218 may be driven by provisional selection or not—context will indicate whether provisional selection is driving the suggestion, e.g., if the suggestion comes from a generator 216 or is generated 1434 then it is presumably driven by provisional selection, and in most but not all cases (an exception being inclusion of an generated 1434 suggestion displayed in a completion list) the entries 304 of a completion list are not driven by provisional selection 220 machine learning model; computational; may be part of a generator 216

302 completion list; digital data structure; entries 304 may be sorted, e.g., by confidence score or other heuristics 304 entry in a completion list; digital data structure (e.g., a string)

306 source code generally; digital 308 digital text other than source code 310 property, in the software development sense, e.g., a source code token, subject to syntax and semantics of a programming language 312 reserved word in a programming language; part of source code 314 data variable, also referred to simply as a "variable"; meant in the software development sense, e.g., a source code token or set of tokens, subject to syntax and semantics of a programming language 316 software data structure, e.g., a source code token or set of tokens, subject to syntax and semantics of a programming language 318 identifier, in the software development sense, e.g., a source code token, subject to syntax and semantics of a programming language 320 application program interface; digital 322 method, in the software development sense, e.g., a source code token, subject to syntax and semantics of a programming language 324 argument of a method, also referred to as a "parameter"; meant in the software development sense, e.g., a source code token or set of tokens, subject to syntax and semantics of a programming language 326 overloaded method, in the software development sense, e.g., a source code token, subject to syntax and semantics of a programming language 328 filtered list of completion entries 304

330 part of a suggestion that is accepted for insertion into document 332 part of a suggestion generally 334 span of a suggestion in number of lines 1232; also refers to act of spanning one or more lines 336 origin of a suggestion; some possibilities include a provisional-selection-driven generator 216, and a completion list entry creator that is not provisional-selection-driven 400 stylized user interface which illustrates user interfaces 210

502 insertion point, also referred to as "text insertion point"; a location in a document in a user interface at which text will be inserted in response to one or more of the following: typing, pasting, accepting a suggestion 1202 hover target, e.g., screen or display coordinate indicated by a cursor; digital 1204 hover target portion of text (e.g., document text 208 of metainformation text 1212) near a hover target; digital 1206 cursor, e.g., visual position indicator in a user interface 1208 user interface gesture, e.g., mouse click, key press; digital; gestures to commit 1310 or accept a suggestion are called "commit gestures"

1210 metainformation 1212 metainformation expressed as digital text 1214 token, in the software development sense 1216 digital description of a token 1214, e.g., interface expected or behavior provided during execution 1218 text of a document located between two parts of a suggestion or between two related suggestions; suggestions are "related", e.g., if they can both be accepted using a single commit gesture or using two consecutive commit gestures (possibly the same gesture twice), or if they are displayed 1422 together 1220 visual indicator of text status in a user interface 210

1222 grey text, e.g., digital text which is lighter, thinner, smaller, or otherwise less visually prominent than nearby text; despite the name, grey text is not necessarily grey in color 1224 highlighted text, e.g., digital text which is shown in a different color or using a different background color than nearby text 1226 bold text, italic text, or underlined text; digital in each case 1228 colored text, e.g., digital text which is shown in a different color than nearby text 1230 text status, e.g., part of a document as opposed to part of a suggestion and hence not part of the document (at least not yet); text status may also be selected (provisionally or otherwise), or not selected; in some embodiments text status for a suggestion includes whether the suggestion was provisional-selection-driven or not 1232 line of text in a user interface; line scope is determined, e.g., by line wrapping or carriage return/line feed/end of file values 1234 set of available provisional items; digital data structure 1236 provisional items, e.g., suggestion entries in a completion list which may or may not currently also be displayed 1238 user input generally; any gesture or data sent to a user interface by action of a user 104

1240 column 1242 grid, e.g., array 1244 scrollable list; may be scrollable vertically, horizontally, or both 1300 flowchart; 1300 also refers to edit automation methods illustrated by or consistent with the FIG. 13 flowchart 1302 computationally obtain a current provisional selection 214, e.g., by tracking user interface routines, using callbacks to user interface routines, or reading user interface data structures 1304 computationally submit edit context information to a suggestion generator 216, e.g., as one or more digital data arguments in one or more calls to a generator API 1306 computationally get a suggestion 218 from a generator 216, e.g., as one or more digital data returns from one or more calls to a generator API 1308 computationally display a suggestion 218 in a user interface, e.g., by calling user interface routines, or writing user interface data structures 1310 computationally commit a suggestion, e.g., by calling user interface or file system routines, or writing document text 208 data structures 1400 flowchart; 1400 also refers to edit automation methods illustrated by or consistent with the FIG. 14 flowchart (which incorporates the steps of FIGS. 4 through 11 and 13)

1402 computationally display text in a user interface, e.g., by calling user interface routines, or writing user interface data structures; displayed text may be, e.g., document text 208, metainformation text 1212, suggestion text 218, completion list entry text 304, editor status text such as the name of the file being edited or error messages, or navigational text such as menus or text reminding a user which gestures will have which effects; performed, e.g., by calling user interface routines or writing user interface data structures 1404 computationally filter a completion item list 1406 computationally receive a gesture indicating acceptance of a suggestion or part thereof; may also be referred to as "accepting" the suggestion 1408 computationally designate a suggestion as accepted in part or as a whole 1410 computationally alter document text 208, e.g., by insertion, deletion, or changing an order in which parts of the document occur 1412 computationally insert part or all of a suggested text into a document 1414 computationally display available provisional items, e.g., in a completion list or in a document or as metainformation text; this is an example of displaying 1402 generally 416 computationally display two or more suggestion parts or two or more related suggestions with intervening document text; this is an example of displaying 1402 generally 418 computationally interleave two or more suggestion parts or two or more related suggestions with intervening document text 420 computationally acquire metainformation text 1422 computationally display two or more suggestion parts or two or more related suggestions at the same time; this is an example of displaying 1402 generally; the respective displays need not be completely simultaneous—an overlap in the time periods of the respective displays also qualifies as displaying them "at the same time"

1424 computationally display a provisional-selection-driven suggestion in a completion list; this is an example of displaying 1402 generally 1426 computationally modify text of a provisional-selection-driven suggestion without previously committing it 1428 computationally commit text of a provisional-selection-driven suggestion after previously modifying it in response to user input 1430 computationally detect that a cursor is hovering 1432 cursor hovering in a user interface 1434 computationally generate a provisional-selection-driven suggestion 1436 computationally gather edit context information 1438 computationally remove a suggestion from a display 126;

although this operation might be called "undisplaying", for present purposes it is an example of displaying 1402 because it changes what is visible on the display

1440 computationally get a suggestion from an origin that is not necessarily provisional-selection-driven

1442 any step discussed in the present disclosure that has not been assigned some other reference numeral

1444 prioritize a suggestion relative to one or more other suggestions 218; computational; may be done, e.g., by applying one or more heuristics such as favoring source code suggestions that compile or successfully pass lint or other code analyzer scrutiny, limiting the number of identifiers in a suggestion, particularly identifiers which have associated metainformation text, setting a minimum length or a maximum length or both for suggestion string length, or basing priority on a confidence score for the suggestion generated by the model 216

CONCLUSION

In short, the teachings herein provide a variety of edit automation functionalities which operate in enhanced systems 202. Edit automation enhancements may be implemented in source code 306 editors 204 and other text editors 204. Provisional selections 214 that indicate user intentions are submitted 1304 to a suggestion generator 216 with other edit context information 212, to improve the quality of generated 1434 text suggestions 218 and reduce the cognitive load on users 104. A provisional selection 214 may include a highlighted 1224 completion list 302 entry 304, or document 206 text 208 targeted 1202 by a hovering 1432 cursor 1206, or metainformation text 1212 targeted 1202 by the hovering cursor 1206, for example. An inline grey text 1222 suggestion 218 driven 1434 by provisional selection 214 may be displayed 1308 simultaneously 1422 with completion list 302 suggestions 304 that were created without regard to provisional selection 214. Suggestions 218 driven 1434 by provisional selection 214 may be interleaved 1418 with existing document text 208. Suggestions 218 may be prioritized 1444 for display (or to avoid display 1308) based on their confidence score or using other heuristics. Suggestions 218 may be accepted 1406 fully in one gesture 1208, or be accepted stagewise (in parts 330). Suggestions 218 may be edited 1426 by a user before being accepted 1406, driving 1304 further suggestion 218 refinement 1434. Multiple suggestions 218, 304 may be displayed 1308, 1402, 1416, 1424 simultaneously 1422, reducing pressure on a machine learning model 220 or other suggestion generator 216.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 4 through 11, 13, and 14 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured to display text suggestions which change according to provisional selections from a user during an editing session, the system comprising:
    a digital memory, the digital memory configurable to contain a document, the document including document text;
    a processor in operable communication with the digital memory;
    a display device;
    an editor having a user interface which upon execution with the processor displays at least a portion of the document on the display device, the user interface including a text insertion point;
    wherein the editor is configured to perform edit automation steps upon execution with the processor, including automatically (a) submitting edit context information to a suggestion generation machine learning model, the edit context information including a provisional selection of displayed text which is a focus of attention in the user interface due to user interaction with the computing system via the user interface, the provisionally selected text corresponding to a completion list entry of a completion list which has a plurality of entries, (b) getting from the suggestion generation machine learning model a token completion text suggestion which is based at least in part on the provisional selection, and (c) displaying the token completion text suggestion near the text insertion point.

2. The system of claim 1, wherein the document text includes source code, and the provisional selection includes at least one of the following:
    a user-indicated entry in a completion list which includes source code method suggestions;
    a user-indicated entry in a completion list which includes an application program interface method suggestion;
    a user-indicated entry in a completion list which includes source code property suggestions;
    a user-indicated entry in a completion list which includes source code reserved word suggestions;
    a user-indicated entry in a completion list which includes source code data variable suggestions;
    a user-indicated entry in a completion list which includes source code data structure suggestions;
    a user-indicated entry in a completion list which includes source code identifiers from one or more application program interface suggestions;
    a user-indicated entry in a completion list which includes source code method argument suggestions; or
    a user-indicated entry in a completion list which includes source code overloaded method suggestions.

3. The system of claim 1, wherein the edit automation steps include producing a filtered completion item list by filtering a set of source code completion items, and wherein the provisional selection includes a user-indicated entry in the filtered completion item list.

4. The system of claim 1, wherein the edit automation steps include detecting that a cursor is hovering over a hover target portion of the document text, and wherein the provisional selection includes at least part of the hover target portion.

5. The system of claim 1, wherein the edit automation steps further comprise committing the token completion text suggestion, and wherein the committing includes:

receiving an acceptance of at least a part of the token completion text suggestion;
designating the part of the token completion text suggestion as an accepted part; and
altering the document text to include a copy of the accepted part.

6. A method which provides updated text suggestions as a user changes provisional selections during a document editing session, the method comprising:
obtaining via a user interface a first provisional selection which is a first focus of attention in the user interface due to user interaction with the computing system via the user interface, the provisional selection corresponding to a completion list entry of a completion list which has a plurality of entries;
submitting the first provisional selection to a suggestion generation machine learning model;
getting from the suggestion generation machine learning model a first text suggestion which is based at least in part on the first provisional selection and which includes a possible line completion; and
displaying the first text suggestion inline in the user interface.

7. The method of claim 6, further comprising:
obtaining via the user interface a second provisional selection which is a second focus of attention in the user interface;
submitting the second provisional selection to the suggestion generation machine learning model;
getting from the suggestion generation machine learning model a second text suggestion which is based at least in part on the second provisional selection;
removing the first text suggestion from being displayed; and
displaying the second text suggestion inline in the user interface.

8. The method of claim 7, further comprising:
getting a third text suggestion from an origin which is not the suggestion generation model; and
displaying the third text suggestion at the same time as displaying the second text suggestion.

9. The method of claim 6, wherein at least one of the following conditions is satisfied:
the first text suggestion spans more than one line of text; or
the first text suggestion includes a multi-part text suggestion having at least two parts, and the method displays the two parts with an intervening portion of document text displayed between the two parts.

10. The method of claim 6, wherein the method integrates semantic completion with full line completion.

11. The method of claim 6, further comprising:
acquiring metainformation text which includes a natural language description of a token that is represented by at least a part of the first text suggestion; and
displaying the metainformation text at the same time as displaying the first text suggestion.

12. The method of claim 6, further comprising:
committing the first provisional selection upon receiving a first instance of a commit gesture; and then
committing at least a part of the first text suggestion upon receiving a second instance of the commit gesture.

13. The method of claim 6, wherein the first provisional selection corresponds to an item in a set of available provisional items, and method comprises displaying at least a portion of the set of available provisional items.

14. The method of claim 6, wherein the method includes modifying the first text suggestion based on user input, and then committing the first text suggestion as modified.

15. The method of claim 6, wherein the method comprises detecting that a cursor is hovering over a hover target, and wherein the first provisional selection corresponds to at least a part of the hover target.

16. A computer-readable storage device configured with data and instructions which upon execution by a processor cause a computing system to perform a method which provides updated text suggestions as a user changes provisional selections during a document editing session, the method comprising:
obtaining via a user interface a first provisional selection corresponding to a first completion set entry of a completion set which has a plurality of entries;
submitting the first provisional selection to a suggestion generation model which includes a machine learning model;
getting from the suggestion generation model a first text suggestion which is based at least in part on the first provisional selection;
displaying the first text suggestion;
obtaining via a user interface a second provisional selection corresponding to a second completion set entry of the completion set;
submitting the second provisional selection to the suggestion generation model;
getting from the suggestion generation model a second text suggestion which is based at least in part on the second provisional selection;
removing the first text suggestion from being displayed; and
displaying the second text suggestion.

17. The storage device of claim 16, wherein the second text suggestion shows an application program interface method and a parameter of the application program interface method.

18. The storage device of claim 16, wherein the method includes getting at least two text suggestions from the machine learning model, and displaying the at least two text suggestions interleaved with document text.

19. The storage device of claim 16, wherein the second text suggestion is displayed as an entry in a completion list.

20. The storage device of claim 16, wherein the provisional selection corresponds to an item in a set of available provisional items, and the method comprises at least one of the following:
displaying a column of available provisional items;
displaying a grid of available provisional items;
displaying a menu of available provisional items; or
displaying a scrollable list of available provisional items.

* * * * *